United States Patent [19]

Ying et al.

[11] Patent Number: 4,987,174

[45] Date of Patent: Jan. 22, 1991

[54] LOW GLOSS POLYACETAL RESIN

[75] Inventors: Edwina Ying, Bridgewater; Conrad G. Hayes, Plainfield, both of N.J.

[73] Assignee: Hoechst Celanese Corporation, Somerville, N.J.

[21] Appl. No.: 446,001

[22] Filed: Dec. 5, 1989

Related U.S. Application Data

[63] Continuation-in-part of Ser. No. 192,633, May 11, 1988, abandoned.

[51] Int. Cl.$^5$ ............................................. C08K 3/34
[52] U.S. Cl. .................................. 524/444; 524/450; 524/593
[58] Field of Search ............... 524/444, 593, 450, 447, 524/452

[56] References Cited

U.S. PATENT DOCUMENTS 3,963,668  6/1976  Wurmb et al. ...................... 524/593
4,394,468  7/1983  Lu ....................................... 523/205

OTHER PUBLICATIONS

Katz et al.; Handbook of Fillers and Reinforcements for Plastics; 1978; Van Nostrand Reinhold Co.; pp. 480–481.

Primary Examiner—Lewis T. Jacobs
Attorney, Agent, or Firm—Depaoli & O'Brien

[57] ABSTRACT

A polyacetal resin composition for use in producing molded articles of low gloss comprises the polyacetal and an aluminosilicate fiber.

20 Claims, No Drawings

LOW GLOSS POLYACETAL RESIN

This is a continuation-in-part application of U.S. Ser. No. 192,633, filed May 11, 1988, now abandoned.

FIELD OF THE INVENTION

The present invention relates to oxymethylene polymer compositions. More particularly, it relates to filled oxymethylene polymer compositions which exhibit reduced surface gloss.

BACKGROUND OF THE INVENTION

The term oxymethylene polymer as used herein is meant to include oxymethylene homopolymers and diethers and diesters. Also included are oxymethylene copolymers, which include oxymethylene polymers having at least 50 percent recurring oxymethylene units and at least one other unit derived from a monomer copolymerizable with the source of the oxymethylene units.

Oxymethylene polymers having recurring —CH$_2$O— units have been known for many years. They may be prepared for example, by the polymerization of anhydrous formaldehyde or by the polymerization of trioxane, which is a cyclic trimer of formaldehyde, and will vary in physical properties such as thermal stability, molecular weight, molding characteristics, color and the like depending, in part, upon their method of preparation, on the catalytic polymerization technique employed and upon the various types of comonomers which may be incorporated into the polymer.

The polyacetal resins are superior in mechanical and physical properties and, therefore, have been widely used in various fields, especially as molding resins. It is known that polyoxymethylenes can be provided with additives in order to improve certain physical properties of the molding resin, and as well the molded products obtained therefrom. Such additives extend the range of possible uses of such polymer compositions. Thus, fillers have been incorporated into the oxymethylene polymers for the purpose of improving rigid strength, hardness, friction resistance and wear resistance, to increase heat distortion temperature, impart fire retardancy, increase dimensional accuracy of the molded articles by decreasing shrinkage, improve electrical conductivity and antistatic property, and to increase economy by using inexpensive fillers. U.S. Pat. No. 4,506,053 cites numerous inorganic and organic fillers which can be included in the form of powder, flakes, or fibers in oxymethylene polymer compositions. Among the vast list of materials disclosed in the patent are included metal silicates such as talc, clay, mica, asbestos, calcium silicate, montmorillonite and bentonite which materials are similar to the low gloss additives used in the present invention to be further discussed.

It is important to recognize that while the use of a particular filler may impart a desired property to the oxymethylene polymer composition, the addition of the filler may also degrade certain other properties. Thus, it is important that the particular filler used achieve improvements in the desired physical property and not degrade the good mechanical properties of polyacetal resins if its use is to be accepted by industry.

One proposed use for polyacetal resins is as molded components in the interior of automobiles. One necessary property of any molded product in an automobile interior is that the surface of the molded article have a low-gloss in order to aesthetically match interior coverings such as seat upholsteries and the like. As before said, it is important that the use of a filler to reduce the gloss of a polyacetal resin not significantly alter the other properties. Thus, the primary objective of the present invention is to provide a low-gloss polyacetal polymer composition which retains its mechanical properties.

SUMMARY OF THE INVENTION

It has now been found that molded articles obtained from a polyacetal resin can be provided with a reduced surface gloss by the incorporation of an aluminosilicate fiber into the polyacetal resin. The polyacetal resin containing the aluminosilicate fiber retains its mechanical properties and is strengthened by the reinforcing effect of such fibers while the molded articles are provided with a uniformly finished surface and a substantial reduction in surface gloss.

DESCRIPTION OF THE PREFERRED EMBODIMENTS

The oxymethylene polymer used in the compositions of the present invention is well known in the art. The polymers are characterized as having recurring oxymethylene groups or units, i.e., —CH$_2$O—. The term oxymethylene polymer as used herein is intended to include any oxymethylene polymer having —CH$_2$O— groups comprising at least about 50 percent of the recurring units, for example, homopolymer, copolymers, terpolymers and the like.

Typically, the homopolymers are prepared by the polymerization of anhydrous formaldehyde or by the polymerization of trioxane which is a cyclic trimer of formaldehyde. For example, high molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds.

The homopolymers are usually stabilized against thermal degradation by end-capping or the incorporation therein of stabilizer compounds such as described in U.S. Pat. No. 3,133,896 to Dolce and Berardinelli.

Oxymethylene polymers that are particularly adapted for use in the compositions of the present invention are oxymethylene copolymers, which may be prepared as described in U.S. Pat. No. 3,027,352 of Walling et al by copolymerizing, for example, trioxane with any of various cyclic ethers having at least two adjacent carbon atoms, e.g., ethylene oxide, dioxolane, and the like.

Especially suitable oxymethylene copolymers which may be used in the compositions of the present invention usually possess a relatively high level of polymer crystallinity, i.e., about 70 to 80 percent. These preferred oxymethylene copolymers have repeating units which consist essentially of (a) —OCH$_2$— groups interspersed with (b) groups represented by the general formula:

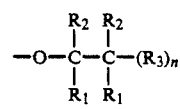

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive. The —OCH$_2$— units of (a) constitute from about 60 to about 99.6 percent of the recurring units. The units of (b) may be incorporated into the copolymer during the step of copolymerization to produce the copolymer by the opening of the ring of a cyclic ether having adjacent carbon atoms, i.e., by the breaking of an oxygen-to-carbon linkage.

Copolymers of the desired structure may be prepared by polymerizing trioxane together with from about 0.4 to about 40 mole percent of a cyclic ether having at least two adjacent carbon atoms, preferably in the presence of a catalyst such as a Lewis acid (e.g, BF$_3$, PF$_5$, and the like) or other acids (e.g., HClO$_4$, 1% H$_2$SO$_4$, and the like).

In general, the cyclic ethers employed in making the preferred oxymethylene copolymers are those represented by the general formula:

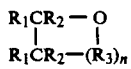

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive.

The preferred cyclic ethers used in the preparation of the preferred oxymethylene copolymers are ethylene oxide and 1,3-dioxolane, which may be represented by the formula:

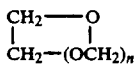

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalyst used in preparing the desired oxymethylene copolymers is the aforementioned boron trifluoride as discussed in the previously identified Walling et al patent. Reference is made to this patent for further information concerning the polymerization conditions, amount of catalyst employed, and the like.

The oxymethylene copolymers that are preferably present in the compositions of the present invention are thermoplastic materials having a melting point of at least 150° C., and normally are millable or processable at a temperature of from about 180° C. to about 200° C. They have a number average molecular weight of at least 10,000. The preferred oxymethylene copolymers have an inherent viscosity of at least 1.0 (measured at 60° C. in a 0.1 weight percent solution in p-chlorophenol containing 2 weight percent of alphapinene).

The oxymethylene copolymer component of the compositions of this invention preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by either solution hydrolysis (hereinafter "SH") or melt hydrolysis (hereinafter "MH") to remove unstable groups. These processes degrade the hemiacetal end groups in the copolymer chain. Both processes are known to those skilled in the art and are in commercial practice. A useful solution hydrolysis process is disclosed in U.S. Pat. No. 3,179,948 and a useful melt hydrolysis process is disclosed in U.S. Pat. No. 3,318,848. If desired, the oxymethylene copolymer may be end-capped by techniques known to those skilled in the art. A preferred end-capping technique is accomplished by acetylation with acetic anhydride in the presence of sodium acetate catalyst. A preferred oxymethylene copolymer is commercially available from Hoechst Celanese Corporation under the designation CELCON ® acetal copolymer. Preferred are acetal copolymers having a melt index of from about 5.0 to 30.0 g/10 min when tested in accordance with ASTM D1238-82.

With respect to the oxymethylene terpolymer, it may be prepared, for example, by reacting trioxane and a cyclic ether and/or cyclic acetal such as in the preparation of the oxymethylene copolymer, with a third monomer which is a bifunctional compound such as a diglycide of the formula:

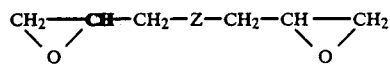

wherein Z represents a carbon-to-carbon bond, an oxygen atom, an oxy-alkoxy of 1 to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propane-diol, cyclohexane-1,4-diol and 2-dimethyl-4-dimethylcyclobutane-1,3-diol, with butanediol diglycidyl ethers being most preferred.

Generally, in preparing the terpolymer of trioxane, cyclic ether and/or cyclic acetal and at least one bifunctional diglycide compound, a ratio of from 99.89 to 89.0 weight percent trioxane, 0.1 to 10 weight percent of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially white and having a particularly good extrudability.

The polymerization of the terpolymer may be carried out according to known methods, that is in substance, solution or suspension, while using the above-mentioned quantitative proportions of the termonomers. As solvents, there may advantageously be used inert aliphatic or aromatic hydrocarbons, halogenated hydrocarbons or ethers.

A preferred terpolymer has the following quantitative proportions: 99.85 to 89.5 weight percent of trioxane, 0.1 to 10 weight percent of cyclic ether or cyclic acetal, and 0.05 to 0.5 weight percent of diglycidyl ether, the percentage figures being calculated on the total weight of the monomer mixture used for preparing the terpolymer.

The oxymethylene polymers may include, if desired, stabilizing agents including formaldehyde scavengers, antioxidants, light stabilizers, etc. and other conventional additives such as plasticizers, colorants and pigments. Suitable formaldehyde scavengers include cyanoguanidine, melamines, polyamides, amine-substituted triazines, amidines, ureas, hydroxyl salts of calcium, magnesium and the like, salts of carboxylic acids, and metal oxides and hydroxides. Suitable mold lubricants include alkylene bisstearamide, long-chain amides, waxes, oils, and polyether glycides. A preferred mold lubricant is commercially available from Glyco Chemical, Inc., under the designation Acrawax C and is alkylene bisstearamide. The preferred antioxidants are hindered bisphenols. Especially preferred is 1,6-hexamethylene bis-(3,5-di-t-butyl-4-hydroxy hydrocynnamate), commercially available from Ciba-Geigy Corp. under the designation Irganox 259.

The aluminosilicate fiber used in the present invention is typically a white to light gray fiber. The fiber color is important in that it should not shift the color of the resin whether the resin is uncolored or colored with dyes or pigments. The aluminosilicate fiber of this invention has an average fiber diameter of from 0.5 to 2.0 microns and an average length of 1 to 5 millimeters. Thus, the fibers have aspect ratios on the order of at least about 1,000 prior to compounding to form the molding composition.

The aluminosilicate fiber useful in the present invention will consist essentially of aluminosilicate with less than 5% of the fiber containing oxides other than alumina and silica. Preferably, the amount of oxides other than alumina and silica will comprise no more than 3 wt.%. Typically, these other oxides will comprise titanium dioxide, iron oxides and alkali metal oxides. The aluminosilicate fibers of the present invention are distinguished over conventional fiberglass fillers such as E-glass which are borosilicate materials.

The composition of the aluminosilicate fiber of the present invention, therefore, will comprise from about 40 to 49 wt. % $Al_2O_3$ and from about 50 to about 55% $SiO_2$ with the remainder comprising other oxides including iron oxides, titanium oxides and alkali metal oxides.

Another important feature of the aluminosilicate fibers useful in the present invention is that the fiber content should comprise at least 85 wt. % fibers. Preferably, no more than 5 wt. % and, most preferably, no more than 2 wt. % of the fibers contain nonfibrous materials such as in the form of coarse spheres. Thus, it has been found that if the fiber content of the aluminosilicate fiber added is substantially less than 85%, the polyacetal resin undergoes a substantial color shift.

In general, the aluminosilicate fiber is added to the polyacetal resin in an amount of from about 1 to 25% by weight based on the total composition. Preferably, the aluminosilicate fiber will be present in amounts of about 1 to about 10% by weight of the total composition and, more preferably, 1 to about 5% by weight. The addition of aluminosilicate fiber in an amount less than 1% by weight does not bring about a sufficient reinforcement of the resin and does not sufficiently reduce the gloss of the molded articles, while the addition in an amount exceeding 10% by weight substantially modifies the physical properties and does not reduce the gloss by any appreciable amount. In amounts greater than 10 wt. %, substantial improvements in tensile strength are found, however, and, thus, in certain applications, large amounts of the aluminosilicate fiber may be useful. The addition of the aluminosilicate fiber to polyacetals is also believed to improve the surface wear or abrasive wear of the surface of articles molded therefrom and, thus, further increase the usage of the polyacetal compositions of this invention.

A preferred aluminosilicate fiber is marketed under the name Fiberfrax HSA Fiber from Sohio Carborundum, Co. Table 1 set forth the typical physical properties and chemical analysis of the Fiberfrax HSA fiber.

TABLE 1

| Properties of Fiberfrax HSA Fiber ® | |
|---|---|
| Typical Physical Properties | |
| Fiber Content | 85% minimum |
| Color | White to Light Gray |
| Melting Point | 1790° C. (3260° F.) |
| Fiber Diameter | 1.2 Microns (mean) |
| Fiber Length | 3 mm (⅛") |
| Specific Gravity | 2.7 g/cm$^3$ |
| Specific Heat at 1093° C. (2000° F.) | 1130 J/kg °C. (0.27 Btu/lb °F.) |
| Fiber Surface Area | 2.5 m$^2$/g |
| Typical Chemical Analysis | |
| $Al_2O_3$ | 43.4% |
| $SiO_2$ | 53.9% |
| $Fe_2O_3$ | 0.8% |
| $TiO_2$ | 1.6% |
| $K_2O$ | 0.1% |
| $Na_2O$ | 0.1% |
| Leachable Chlorides | 10 ppm |

The composition according to the present invention can be produced by various methods. For example, pellets obtained by extruding a preblend consisting of the resin ingredient and aluminosilicate fiber in an extruder can be molded in a molding machine. Known additives such as various kinds of organic high-molecular substances or inorganic fillers may be added to the polyacetal resin composition according to the present invention dependent upon the uses thereof. Organic high-molecular substances include polyurethanes, vinylic compounds and copolymers thereof such as ethylene/vinyl acetate copolymer, ethylene/alkyl acrylate copolymer, styrene/butadiene/acrylonitrile copolymer and styrene/acrylonitrile copolymer; multiphase graft copolymers comprising polyacrylate resins; and segmented thermoplastic copolyesters. Inorganic fillers include glass fibers, carbon fibers, glass flakes, mica, talc, calcium carbonate, etc. as long as such fillers do not reduce the desired physical properties of the molded article and, in particular, do not degrade the surface characteristics of the molded article including surface gloss, smoothness, uniformity of color, color shift, warpage, wear properties, etc. In addition, antistatic agents or electrical conductivity improving agents such as electrically conductive carbon black, coloring agents including dyes and pigments, mold release agents, nucleating agents, stabilizers, and the like may be added to the composition to give necessary properties thereto. The additives may be blended prior to or subsequent to when the aluminosilicate fiber is blended with the polyacetal, or may be added to the resin in the form of a mixture thereof with the aluminosilicate fiber.

The composition according to the present invention shows not only remarkably reduced surface gloss but also a high tensile strength. Accordingly, the polyacetal composition of the present invention can be used in the production of the interior components used in automobiles such as dash boards and interior plastic components needed to match interior upholstery. Other low gloss, high strength applications include furniture, rifle housings, etc. The effects of the present invention will now be described in more detail with reference to examples and comparative examples.

stantially the same as the control indicating little color shift.

TABLE 2

| Formulation | 1 | 2 | 3* | 4 | 5 | 6* | 7 | 8 |
|---|---|---|---|---|---|---|---|---|
| Celcon M90-04 | 95 | 90 | 92 | 94 | 94 | 92 | 94 | 92 |
| Blue Color Conc. | 5 | 5 | 5 | 5 | 5 | 5 | 5 | 5 |
| Glass Sphere | — | 5 | 3 | 1 | — | — | — | — |
| Silica | — | — | — | — | 1 | 3 | | |
| Aluminosilicate Fiber | — | — | — | — | — | — | 1 | 3 |
| Physical Properties | | | | | | | | |
| Tensile Strength | | | | | | | | |
| Yield, psi | 8.67 | a | 8.52 | — | — | 8.67 | 8.54 | 8.65 |
| Modulus, ksi | 379 | a | 309 | — | — | 412 | 401 | 401 |
| Elongation, % | 37 | a | 31 | — | — | 41 | 39 | 49 |
| Flexural Strength | | | | | | | | |
| 5% Strain, psi | 12.8 | a | 12.0 | — | — | — | 12.7 | 12.8 |
| Modulus, ksi | 369 | — | 366 | — | — | 377 | — | 387 |
| Notched Izod, ft-lb/in | 1.04 | a | 0.93 | — | — | 0.89 | 0.93 | 0.95 |
| Surface Properties | | | | | | | | |
| Hunter Color b | −4.18 | — | −3.54 | — | — | −3.55 | — | −4.34 |
| Specular Gloss @45° ASTM D-523 | 48 | 32 | 43 | 47 | 47 | 42 | 30 | 22 | a Physical properties were not measured because the surface appearance was not acceptable.
*Physical properties were adjusted based on control as data generated on runs separate from Examples 7 and 8.

EXAMPLES 1-8

Blends comprising a polyacetal resin (Celcon M90-04, a stabilized oxymethylene copolymer having a melt index of 9.0 g/10 min), a color concentrate and aluminosilicate fiber (Fiberfrax HSA Fiber ®) were made in the proportions as shown in Table 2 (Samples 7 and 8) for comparison with compositions comprising the colored polyacetal control and colored polyacetals containing glass spheres and silica, respectively. All percentages are by weight. All the blends were extruded in an extruder and then molded in an injection molding machine to prepare test pieces for mechanical and surface properties including surface gloss and color. Several of the glass- and silica-containing compositions were run separately from the control and fiber runs. All runs used a mold temperature of 200° F. to provide uniform comparison of the surface properties of the molded test article. The results of testing the control formulations and the formulations which contain the aluminosilicate fibers of the present invention are also shown in Table 2.

As is obvious from the results, the compositions according to the present invention not only show similar and improved mechanical properties relative to a polyacetal control, but also substantially reduced surface gloss of the molded articles. Also, the color of the composition containing the aluminosilicate fibers was sub-

EXAMPLES 9-11

Samples of a polyacetal resin comprising Celcon M90 and containing 20 wt. % of a thermoplastic polyurethane impact modifier were compounded, molded and tested to determine the affect an aluminosilicate fiber and an E-glass fiber have on the gloss of such samples. Example 9 was a control sample comprising the impact modified polyacetal resin alone. Example 10 was a sample of the same impact modified polyacetal resin as in Example 9 compounded with 3 wt. % of Fiberfrax HSA fiber. Example 11 was a sample of the impact modified polyacetal resin used in Example 9 compounded with 2 wt. % of E-glass fiber. The Specular Gloss @45° (ASTM D-523) for Example 9 averaged out to 55. The Specular Gloss for Example 10 averaged out to 23. The Specular Gloss of Example 11 was 39.4 with the flow and 34.5 transverse to flow.

What is claimed is:

1. A polyacetal resin composition which comprises a polyacetal containing —$CH_2O$— recurring units and aluminosilicate fibers consisting essentially of aluminosilicate with less than 5 wt. % of said aluminosilicate fiber containing oxides other than alumina and silica.

2. The polyacetal resin of claim 1 wherein said aluminosilicate fiber is present in an amount of from about 1 to about 25% by weight of the composition.

3. The polyacetal composition of claim 2 wherein said aluminosilicate fiber is present in an amount from about 1 to about 10% by weight of the composition.

4. The polyacetal resin composition of claim 3 wherein said aluminosilicate fiber is present in an amount of from about 1 to about 5 wt. % of the composition.

5. The polyacetal composition of claim 1 wherein said polyacetal is an oxymethylene polymer comprising at least about 50% of —$CH_2O$— recurring units.

6. The polyacetal resin composition of claim 1 wherein said polyacetal comprises an oxymethylene copolymer comprising at least 50% of recurring units of —$OCH_2$— groups interspersed with groups represented by the general formula:

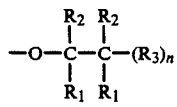

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

7. The polyacetal resin composition of claim 6 wherein said —OCH$_2$— groups constitute from about 60 to 99.6% of the recurring units of said copolymer.

8. The polyacetal composition of claim 5 wherein the polyacetal resin has a melt index from about 5.0 to 30.0 g/10 min.

9. The polyacetal resin composition of claim 1 wherein said aluminosilicate fibers have an aspect ratio of at least about 1,000.

10. The polyacetal resin composition of claim 1 wherein said aluminosilicate fiber has a fiber content of at least 85 wt. % and less than 15 wt. % of non-fiber content in the form of coarse spherical material.

11. The polyacetal resin composition of claim 10 wherein the non-fiber content of said aluminosilicate fibers is no greater than 5 wt. %.

12. The polyacetal resin composition of claim 10 wherein the non-fiber content of said aluminosilicate fibers is no greater than 2 wt. %.

13. A polyacetal resin composition which comprises an oxymethylene copolymer comprising at least 50% of recurring units of —OCH$_2$— groups interspersed with groups represented by the general formula

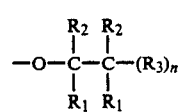

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive and from about 1 to about 25% by weight based on the total composition of aluminosilicate fiber consisting essentially of aluminosilicate with less than 5 wt. % of said aluminosilicate fiber containing oxides other than alumina and silica.

14. The polyacetal composition of claim 13 wherein said aluminosilicate fiber is present in an amount from about 1 to about 10% by weight of the composition.

15. The polyacetal resin composition of claim 14 wherein said aluminosilicate fiber is present in an amount of from about 1 to about 5 wt. % of the composition.

16. The polyacetal composition of claim 13 wherein the polyacetal resin has a melt index from about 5.0 to 30.0 g/10 min.

17. The polyacetal resin composition of claim 13 wherein said —OCH$_2$— groups constitute from about 60 to 99.6% of the recurring units of said copolymer.

18. The polyacetal resin composition of claim 13 wherein said aluminosilicate fiber has a fiber content of at least 85 wt. % and less than 15 wt. % of non-fiber content in the form of coarse spherical material.

19. The polyacetal resin composition of claim 18 wherein the non-fiber content of said aluminosilicate fibers is no greater than 2 wt. %.

20. A molded article formed from the composition of claim 1.

* * * * *